(12) United States Patent
Vandemar

(10) Patent No.: US 9,038,139 B2
(45) Date of Patent: *May 19, 2015

(54) MULTIPLE IMAGE REVERSE TURING TEST

(71) Applicant: Michael J. Vandemar, Largo, FL (US)

(72) Inventor: Michael J. Vandemar, Largo, FL (US)

( * ) Notice: Subject to any disclaimer, the term of this patent is extended or adjusted under 35 U.S.C. 154(b) by 186 days.

This patent is subject to a terminal disclaimer.

(21) Appl. No.: 13/645,900

(22) Filed: Oct. 5, 2012

(65) Prior Publication Data

US 2013/0036457 A1    Feb. 7, 2013

Related U.S. Application Data

(63) Continuation of application No. 12/122,628, filed on May 16, 2008, now Pat. No. 8,627,419.

(60) Provisional application No. 60/931,866, filed on May 25, 2007.

(51) Int. Cl.
  *G06F 7/04*    (2006.01)
  *G06F 21/00*   (2013.01)
  *G06F 21/31*   (2013.01)

(52) U.S. Cl.
  CPC ........ *G06F 21/31* (2013.01); *G06F 2221/2133* (2013.01)

(58) Field of Classification Search
  None
  See application file for complete search history.

(56) References Cited

U.S. PATENT DOCUMENTS

| 7,856,477 | B2 * | 12/2010 | Libbey et al. | 709/206 |
| 2004/0042641 | A1 * | 3/2004 | Jakubowski | 382/115 |
| 2005/0138376 | A1 * | 6/2005 | Fritz et al. | 713/168 |
| 2007/0250920 | A1 * | 10/2007 | Lindsay | 726/7 |
| 2008/0072293 | A1 * | 3/2008 | D'Urso | 726/4 |
| 2009/0046856 | A1 * | 2/2009 | Mitchell | 380/243 |

* cited by examiner

*Primary Examiner* — Izunna Okeke
*Assistant Examiner* — Abdulhakim Nobahar
(74) *Attorney, Agent, or Firm* — Inventions International Inc.; Tiffany C. Miller

(57) ABSTRACT

In a Reverse Turing Test an applicant seeking access to a computer process is presented with an image containing human-readable data that is intended to be inaccessible to an automated process or bot. In an improved Reverse Turing Test the applicant is presented with multiple sub-images that have to be rearranged in order to yield the overall image. This does not substantially increase a human applicant's difficulty in dealing with the test, but makes it much more difficult for a bot to interpret the image.

18 Claims, 4 Drawing Sheets

MULTIPLE IMAGE REVERSE TURING TEST

CROSS REFERENCE TO RELATED APPLICATIONS

This application is a continuation of co-pending U.S. patent application Ser. No. 12/122,628, filed May 16, 2008, entitled, "Multiple Image Reverse Turing Test," which claims priority to U.S. Provisional Patent Application No. 60/931,866, filed May 25, 2007, entitled, "Multiple Image Reverse Turing Test."

FIELD OF THE INVENTION

The present invention relates generally to the field of electronic security methods, and in particular to a method for determining whether an applicant for use of a secured computer, computer system or computer process is a human or is an automated process. More specifically, the invention involves human skills of using a combination of image assembly from individual parts and visual recognition of the assembled image.

BACKGROUND OF THE INVENTION

It is often desirable or necessary to determine if a particular applicant seeking to use an electronic service remotely is in fact a human being, and not an automated system. For example, web sites on the Internet that offer access for free to humans but want to restrict automated programs (sometimes referred to as "bots") from abusing their system need a way to distinguish between the two. This is often the case in situations where normal human usage would put an acceptable load on a server that automated processes could easily exceed. Additionally, in many cases bots are designed to use computer system services for purposes that they are not intended for, such as mass registering for free email accounts that are then used to send unsolicited advertising.

Currently, a commonly used automated method for making the determination of whether an applicant for access to a secured service or computer system is a human or is a bot is what is known as a reverse Turing test (RTT). This can involve presenting the applicant with an image (or a data set convertible into an image), which can, for example, contain either a string of characters or a picture of a readily recognizable object, and having the user identify what is presented in the image. Typically the images presented to the users are distorted in an attempt to make it more difficult for Optical Character Recognition (OCR) software, and other visual recognition programs, to determine what the image is (thereby allowing automated systems to fool the process of identifying whether a user is in fact human). One of the problems being encountered is that as the methods for identifying text and images by computer programs advance, the images must be obfuscated or distorted more and more, increasing the difficulty for a human user to identify the images as well. Therefore a method of increasing the difficulty for a machine or bot to pass an RTT, without increasing the difficulty for a human user, is highly desirable.

SUMMARY OF THE INVENTION

A method of distinguishing a human user from a machine is provided. The method comprises using an algorithm to generate a data set representative of an image containing data that is visually identifiable by a human. The image is divided into multiple sub-images. In a preferred embodiment the data set comprising the sub-images is then communicated to the applicant's computer where all the sub-images are preferably presented simultaneously by means of a graphic user interface (GUI) that provides means to manipulate the positioning, size, or alignment of the various sub-images. This may be done, for example by recourse to a Dynamic Hypertext Markup Language (DHTML) web page, a Flash multimedia program, or a web page written in some future standard of HTML or other web layout language that inherently allows for the user to reposition and manipulate elements contained within it. Through the use of a keyboard, mouse, or similar input device conventionally used with a human user's computer, a human applicant can manipulate the position, alignment, and rotation of the sub-images in such a way that the original image can be reassembled.

A human applicant can reassemble the image and indicate to the security process that he or she recognizes the data. This may be done through actions such as inputting data contained within the reassembled image or by following directions contained within the data. That user interaction is then received and interpreted. A determination of whether the user is a human or not is made based on a comparison between what the user inputs and what data the original image contained.

The additional step of requiring the image to be correctly assembled before identification of the data contained within it can be made adds another level of difficulty that image recognition software would have to overcome in order to trick the system into thinking that a human was attempting to make access. This process, however does not substantially increase the effort a human would encounter. Another aspect of preferred embodiments of the present invention is that a method comprising the recited steps of overlaying data and image, chopping up the image, shuffling the pieces and sending the resultant puzzle to a requestor for solving is a method of controlling access to a computer or service in order to inhibit unauthorized use.

BRIEF DESCRIPTION OF THE DRAWINGS

The present invention is illustrated by way of example, and not limitation, in the following figures of the accompanying drawings.

DETAILED DESCRIPTION

In studying this Detailed Description, the reader may be aided by noting definitions of certain words and phrases used throughout this patent document. Wherever those definitions are provided, those of ordinary skill in the art should understand that in many, if not most instances, such definitions apply to both preceding and following uses of such defined words and phrases. As noted above, "bot" stands for an algorithmic process that can, to some extent, mimic the behavior of a human seeking access to a service or process furnished by a computer. The words "user" and "applicant" are used more or less interchangeably to denote either a person or a bot seeking access to a computer. Moreover, the phrase "access to a computer" shall stand for any sort of such access including, but not limited to, access to the operating system of a single computer, access to a computer system, access to a process or service operating on one or more computers or to an information service supplied by a computer, regardless of whether it is supplied locally or remotely. Much of the following discussion is couched in terms befitting an internet-based scenario in which an applicant uses a computer to transmit a service request to a remote computer that can grant or deny that request. It will be understood, however, that the methods disclosed herein are not limited to that scenario and do not depend on the details of data transmission. For example, the claimed methods of distinguishing a human applicant from a bot are applicable to a single-computer environment in which the novel method is used to prevent access to a secured program by a viral bot running on the computer. Moreover, those skilled in the art will understand that in the interest of clarity of presentation much of this disclosure is presented in terms of what a human applicant would see on a graphical user interface—i.e., an image or a collection of images—and not in terms of data sets or computer files that a rival bot would process.

Methods of distinguishing a human user from a bot are described. Numerous specific details are set forth in the following description for the purposes of explanation, to aid in a thorough understanding of the present invention. It will be evident, however, to one skilled in the art that the present invention may be practiced without these specific details. It will be appreciated that those skilled in the art will be able to devise various other arrangements, which, although not explicitly described or shown herein, embody the principles of the invention, and are included within its spirit and scope.

Figure 1:
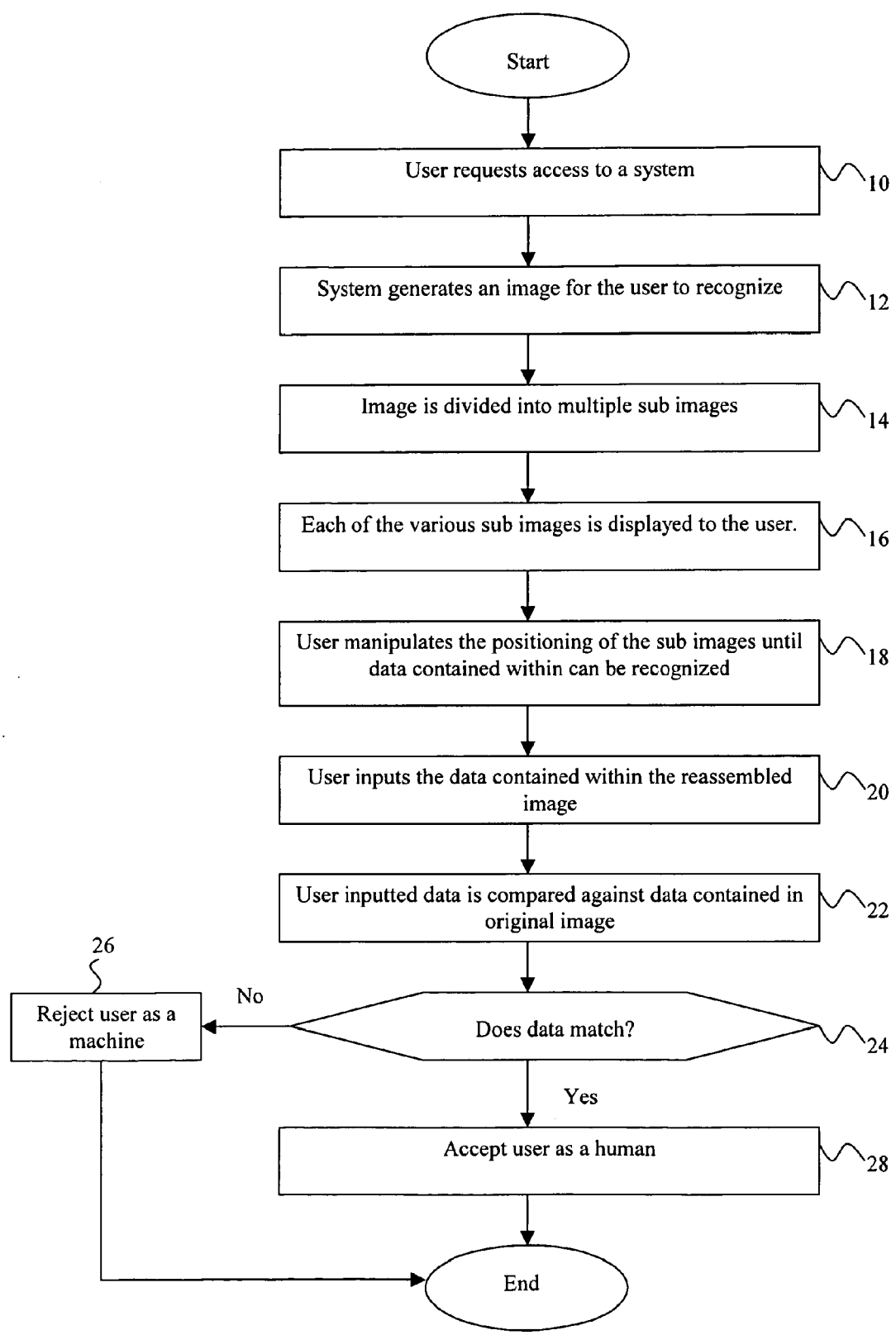
FIG. 1 shows a flowchart of a method for determining whether an applicant is a human or an algorithmic process or bot in accordance with one illustrative embodiment of the present invention.

FIG. 1 shows a flowchart of a method for determining whether a given user is a human or a bot in accordance with one illustrative embodiment of the present invention. In particular, an access request is made by the applicant in step 10. The system generates a data set representative of an image containing reference data in Step 12. This image is divided equally or unequally, with or without rotation, resizing, or inversion into various sub-images (step 14).

The various sub-images are displayed to the user in step 16, generally in a single interface that allows for their position, orientation or size to be individually or collectively manipulated through user input. The sub-images are separated and shuffled, as generally indicated in FIGS. 2-5. Other means of shuffling can include rotating or flipping of the various sub-images along either the x-axis or the y-axis, or resizing of the individual sub-images.

Using available input devices, such as a mouse or other input device attached to a computer, the user arranges the various sub-images until the reference data is evident (step 18). The applicant then inputs that data or responds in such a way indicating that the data contained within the reassembled image is recognized (step 20). The input data or the interaction performed by the user is then compared against the data that was contained within the original image step 22.

The decision as to whether or not the data or interaction received from the user matches the data contained within the original image is made step 24. If the data does not match, then the user is rejected as being a machine or bot (step 26). If the data does match, then the user is accepted as being human (step 28).

Figure 2:
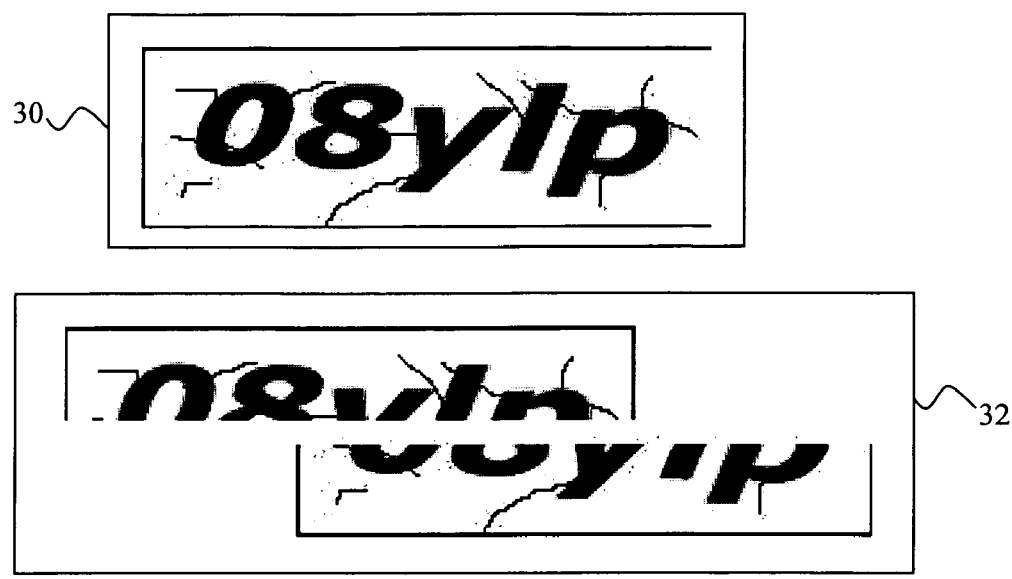
FIG. 2 shows an exemplary method, in accordance with another aspect of the invention, of how a generated image containing human readable reference data might be presented to the user after being divided into upper and lower sections.

FIG. 2 shows an exemplary illustration of an image containing data and that is divided into multiple sub-images which are then presented to the user for reassembly. In particular, the original image contains the data for the user to recognize in step 30. The image is then divided into upper and lower portions in step 32.

These separate sub-images are then presented to the user for reassembly by positioning through drag and drop, which is to say selecting with the mouse, dragging them to another location and releasing the mouse to leave the given sub image in the new location.

In this example the upper sub image is aligned horizontally above the lower sub image by the user, after which the user inputs the data contained within the reassembled image. This inputted data is then compared by the system against the data contained within the original image for purposes of making the determination as to whether the user is human or bot.

Figure 3:
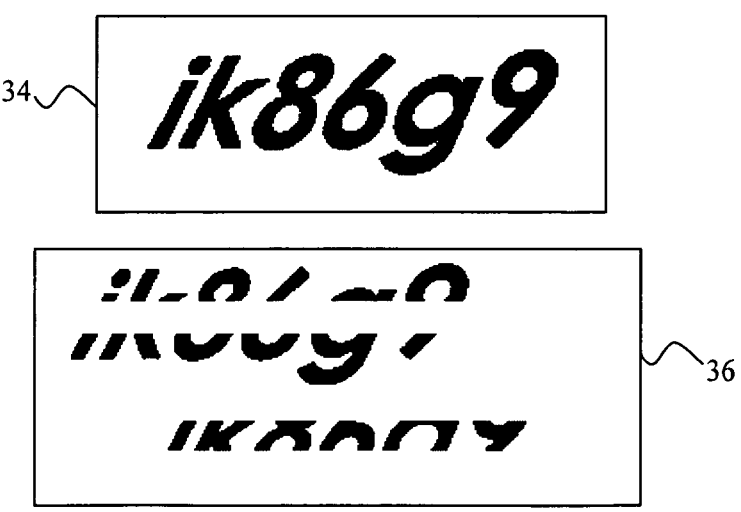
FIG. 3 shows an exemplary method, in accordance with another aspect of the invention, of how a generated image containing reference data might be presented to an applicant after being divided in such a way that the middle section is separated from the remainder of the image.

FIG. 3 shows an exemplary illustration of another method of dividing the original visual data-containing image into multiple sub-images, this time by virtue of using image transparencies. Again, the original image contains the data for the user to recognize in step 34. The image is divided in such a way that the horizontal middle section is removed from the original image, and a copy of that middle section is placed on a new image containing a transparent background step 36.

These separate sub-images are presented to the user for reassembly by positioning the sub image created from the horizontal middle portion of the original image directly over the sub image that has the middle section removed. After reassembly the user inputs the data contained within the reassembled image, said inputted data is then compared by the system against the data contained in the original image in order to determine if the user is human or bot.

Figure 4:
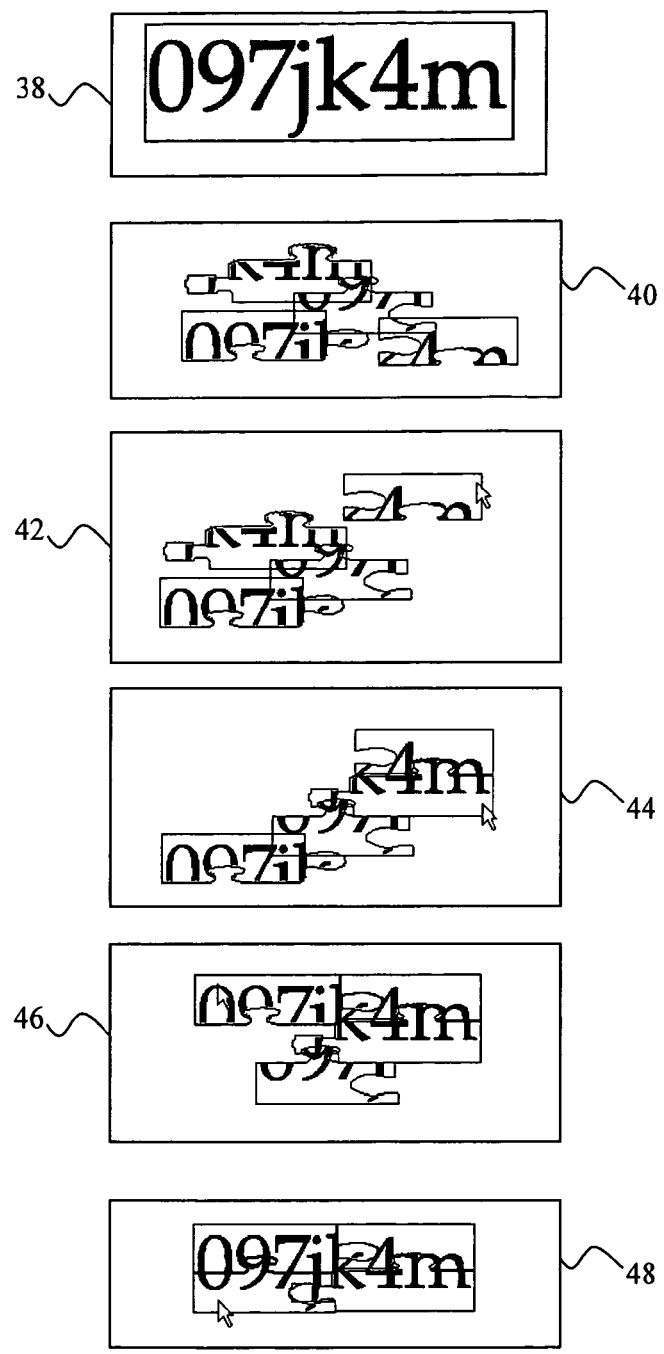
FIG. 4 shows an exemplary method, in accordance with another aspect of the invention, of how a generated image containing reference data might be presented to the user after being divided in such a way that the various sub-images resemble, and fit together as, the irregular pieces of a jigsaw puzzle.

FIG. 4 shows an exemplary illustration of another method of dividing the original visual data-containing image into multiple sub-images, this time through the use of splines or other patterns to create irregularly shaped pieces that fit together to form the whole. In particular, again the original image contains the data for the user to recognize step 38. The image is then divided in such a way that the upper left, upper right, lower left, and lower right sections are separated from one another, and through the use of transparencies an interlocking pattern is associated with each of the sections.

These separate sub-images are presented to the user in a DHTML web page after being shuffled in step 40. Using the mouse to drag and drop the sections, the user positions the upper right (step 42), lower right (step 44), upper left 46, and lower left 48 sub-images so that the data contained within the original image can be seen. After reassembly the user inputs the data contained within the reassembled image, the inputted data then being compared by the system against the data contained in the original image in order to determine if the user is a human or a bot.

Figure 5:
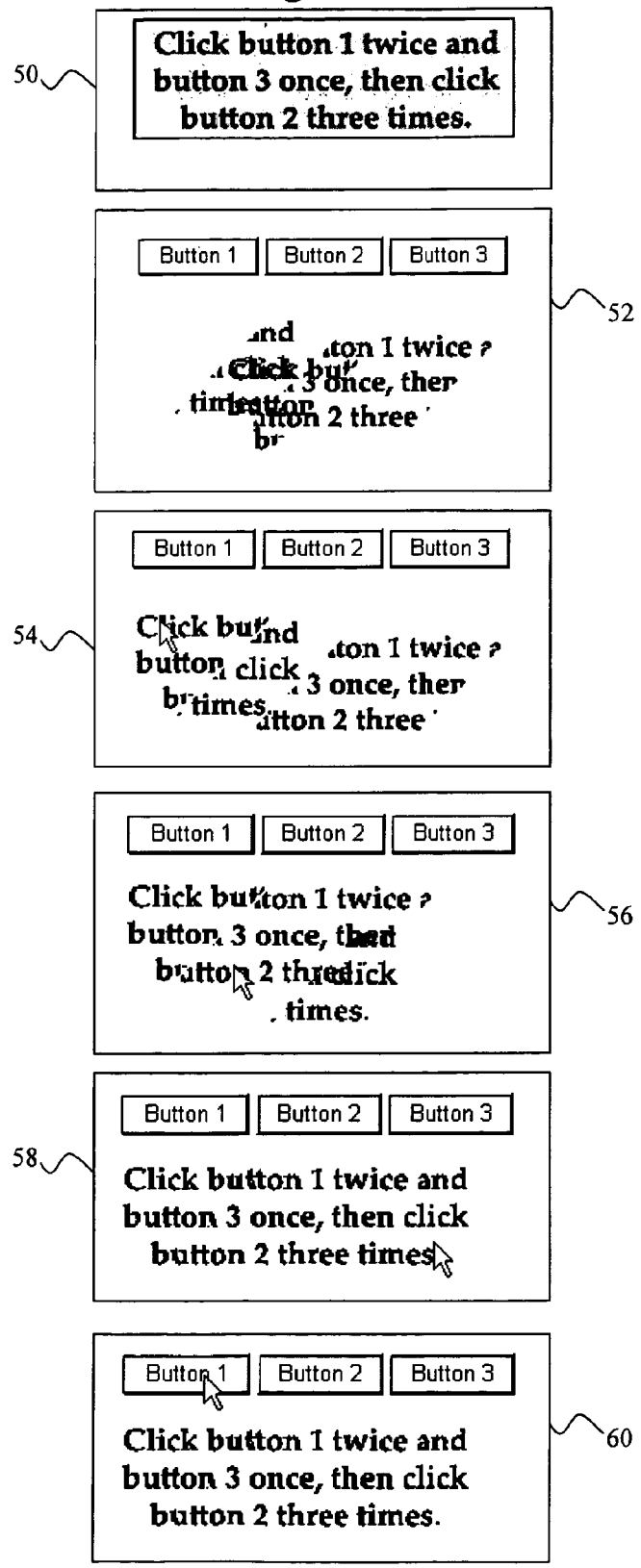
FIG. 5 shows an exemplary method, in accordance with another aspect of the invention, of how a generated image containing reference data, with the reference data being in the form of instructions, might be presented to the user after being divided in such a way that the various sub-images are sliced into diagonal sections.

FIG. 5 shows an exemplary illustration of another method of dividing the original visual data-containing image into multiple sub-images by dividing the image into diagonal slices. In particular, the original image contains instructions for the user to recognize and follow (step 50). The image is then divided in such a way that the left, middle, and right sections are separated from one another into diagonal shapes.

These separate sub-images are presented to the user in a DHTML web page after being shuffled, along with three HTML buttons step 52. Using the mouse to drag and drop the sections, the user positions the left section step 54, middle section step 56, and right section 58 so that the data contained within the original image, in the form of instructions for the user to follow, can be seen.

After reassembly the user follows the instructions contained within the reassembled image 60. The user's actions are then compared by the system against the data contained in the original image in order to determine if the user is human or bot.

Thus, methods of distinguishing a human user from a machine, or bot, have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A method of authenticating a user as human, comprising the steps of:
   providing a segmented image, said segmented image having at least a first portion of said segmented image being positioned in a non-contacting position with a second portion, said first portion of said segmented image having a first portion boarder, said second portion of said segmented image having a second portion boarder, said first portion border is adapted to abut said second portion border by said user, thereby, orienting said first portion of said segmented image and said second portion of said segmented image at a juxtaposed location;
   a computer presenting said segmented image to said user by a graphical user interface;
   configuring said segmented image to be assembled by said user within said graphical user interface, whereby, said first portion of said segmented image is adapted to be aligned in a non-overlapping orientation with said second portion of said segmented image by said user, whereby, at least one of said first portion of said segmented image and said second portion of said segmented image are adapted to be positioned by said user without said first portion of said segmented image overlapping said second portion of said segmented image, thereby creating a non-segmented image;
   identifying a data set within said non-segmented image;
   requiring said user input of said data set; and,
   authenticating said user as human, said authentication based on a comparison between said user input and said data set from said non-segmented image.

2. The method of authenticating a user as human of claim 1, wherein: said segmented image has said first portion aligned parallel to said second portion in a non-contacting position.

3. The method of authenticating a user as human of claim 1, wherein said segmented image is configured to be assembled from drag and drop of an input device; said input device is a computer mouse or other input device in communication with a computer.

4. The method of authenticating a user as human of claim 1, wherein said segmented image is configured to be manipulated by position, alignment, orientation, size, or rotation.

5. The method of authenticating a user as human of claim 1, wherein said user input is said data set contained within said non-segmented image.

6. The method of authenticating a user as human of claim 1, wherein said user input is a prompt contained within said data set of said non-segmented image.

7. A method of prohibiting an unauthorized user from accessing a system, comprising the steps of:
   providing a non-segmented image, said non-segmented image having a configuration containing a data set;
   prompting said non-segmented image to be configured into a segmented image with at least a portion of one segment being positioned in a non-contacting position of said non-segmented image, said portion of one segment having a boarder, said segmented image having a boarder, said border of said portion of one segment is adapted to abut said border of said segmented image by a user, thereby, orienting said portion of one segment and said segmented image at a juxtaposed location;
   presenting said segmented image by a graphical user interface of a computer to be assembled by said user, whereby, said portion of one segment is adapted to be aligned in a non-overlapping orientation with said segmented image by said user, whereby, said portion of one segment is adapted to be positioned by said user without overlapping said segmented image, thereby creating said non-segmented image;
   displaying said data set within said non-segmented image;
   requiring the user input of said data set by said computer;
   determining by said computer if said user is said unauthorized user by comparing said input with said data set from said non-segmented image; and,
   prohibiting by said computer said unauthorized user access to said system if said unauthorized user's said input does not match with said data set.

8. The method of prohibiting an unauthorized user of claim 7, wherein: said non-segmented image is configured into said segmented image using an image transparency, whereby said image transparency has at least one portion relocated from said non-segmented image forming said segmented image; whereby incorrect alignment of said segmented image denies access to the system.

9. The method of prohibiting an unauthorized user of claim 7, further comprising: said non-segmented image being configured into said segmented image having at least one segmented portion divided by an irregularly shaped pattern; said segmented portion having an edge keyed to mate with an edge of said segmented image; whereby incorrect alignment of said segmented image denies access to the system.

10. The method of prohibiting an unauthorized user of claim 7, further comprising: said non-segmented image being configured into said segmented image having at least one diagonal slice; whereby at least one segment is positioned in a non-contacting position of said segmented image; whereby incorrect alignment of said segmented image denies access.

11. The method of prohibiting an unauthorized user of claim 7, wherein said unauthorized user input is an incorrect or a non-entered prompt denying access.

12. The method of prohibiting an unauthorized user of claim 7, wherein said segmented image is configured to be manipulated by position, alignment, orientation, size, or rotation; whereby incorrect alignment of said segmented image denies access.

13. The method of prohibiting an unauthorized user of claim 7, wherein: said segmented image is configured to be assembled from drag and drop of an input device; said input device is a computer mouse or other input device in communication with a computer; whereby incorrect alignment of said segmented image denies access.

14. A method of authenticating a user as human, comprising the steps of:
- said user requesting access to a system;
- generating a segmented image for said user to identify, said segmented image containing a segmented data set;
- said segmented image having a boarder, whereby, said boarder of at least one segment of said segmented image is adapted to abut said boarder of a juxtaposed segmented image;
- a computer presenting said segmented image to said user by a graphical user interface;
- configuring said segmented image into a non-segmented image by said user within said graphical user interface, whereby, said segmented image is aligned in a non-overlapping orientation with another segmented image containing said segmented data set by said user;
- said user identifying said data set within said non-segmented image;
- submitting an input by said user; and,
- said computer authorizing said user as human by matching said input to said data set in said non-segmented image.

15. The method of authenticating a user as human of claim 14, wherein at least one portion of said segmented image is rotated along an x-axis or a y-axis.

16. The method of authenticating a user as human of claim 14, wherein at least one segment of said segmented image is inverted along an x-axis or a y-axis.

17. The method of authenticating a user as human of claim 14, wherein: said segmented image is configured to be assembled from drag and drop of an input device; said input device is a computer mouse or other input device in communication with a computer.

18. The method of authenticating a user as human of claim 14, wherein: said input submitted by said user is a data set containing instructions for said user to perform the authentication process.

* * * * *